United States Patent [19]

Oka

[11] Patent Number: 5,100,977

[45] Date of Patent: Mar. 31, 1992

[54] PRODUCTION PROCESS OF POLYANILINE DERIVATIVES

[75] Inventor: Osamu Oka, Shizuoka, Japan

[73] Assignee: Tomoegawa Paper Co., Ltd., Japan

[21] Appl. No.: 693,268

[22] Filed: Apr. 30, 1991

[30] Foreign Application Priority Data

May 2, 1990 [JP] Japan .................. 2-115162

[51] Int. Cl.$^5$ .............................. C08G 73/00
[52] U.S. Cl. ..................... 525/540; 528/422
[58] Field of Search .............. 525/540; 528/422

[56] References Cited

PUBLICATIONS

Abe et al., Chem. Soc., Chem. Commun., 1989.
Dao et al., Synthetic Metals, 29(1989)E377–E382.
Dao et al., Synthetic Metals, 29(1989)E383–E388.
Wei et al., J. Phys. Chem. 1989, 93, 495–499.

*Primary Examiner*—Harold D. Anderson
*Attorney, Agent, or Firm*—Lowe, Price, LeBlanc & Becker

[57] ABSTRACT

A process is provided for the production of polyaniline derivatives, which are soluble in general organic solvents, without impairment of the inherent good properties of the corresponding polyanilines. The production process comprises treating each starting polyaniline with ammonia to convert the former to a soluble polyaniline, treating the soluble polyaniline with excess hydrazine to convert the former to a reduced polyaniline, dissolving the reduced polyaniline in an amide solvent, and then adding a halogenated hydrocarbon to the resulting solution, thereby introducing a hydrocarbon group to nitrogen atoms of the reduced polyaniline.

6 Claims, No Drawings

PRODUCTION PROCESS OF POLYANILINE DERIVATIVES

BACKGROUND OF THE INVENTION

1. Field of the invention

The present invention relates to an improved process for the production of polyaniline derivatives soluble in organic solvents.

2. Description of the Related Art

Investigation has been conducted in recent years with a view toward applying polyanilines as new electronic materials or electroconductive materials in a wide variety of fields such as cell electrode materials, antistatic materials, electromagnetic shielding materials, functional devices—e.g., photoelectric transducers, optical memories and various sensors—, display devices, various hybrid materials, transparent electroconductors, and various terminal equipment.

Polyanilines however have a highly developed π-conjugated system. They are hence accompanied by the serious drawbacks that they are insoluble in most organic solvents and do not melt even when heated due to having a rigid main chain and the existence of strong interaction and many strong hydrogen bonds between polymer chains and also have poor moldability and permit neither cast molding nor coating.

They are therefore formed, for example, into electroconductive composite materials by impregnating base materials of a desired shape—such as fibers, porous bodies or the like of high-molecular materials—with their corresponding aniline monomers and then bringing the monomers into contact with a suitable polymerization catalyst or subjecting the monomers to electropolymerization to polymerize the monomers. As an alternative, such aniline monomers are polymerized in the presence of powder of a thermoplastic polymer to obtain similar composite materials.

In the meantime, polyanilines soluble in N-methyl-2-pyrrolidone alone have also been synthesized by suitably choosing the polymerizaiton catalyst and reaction temperature [M. Abe et al.: J. Chem. Soc.,Chem. Commun., 1736 (1989)]. These polyanilines are however practically insoluble in other general organic solvents so that their application filed is limited.

To produce an N-Hydrocarbyl-substituted polyaniline, it has heretofore been known to homopolymerize an N-hydrocarbyl-substituted aniline or to copolymerize aniline with an N-hydrocarbyl-substituted aniline. These processes however involve the problems that the polymerization degree of the resultant N-hydrocarbyl-substituted polyaniline is low and the content of hydrocarbon groups can hardly be increased.

SUMMARY OF THE INVENTION

An object of the present invention is to overcome the above-described problems and therefore to provide a process for producing a polyaniline derivative, which is soluble in general organic solvents, without impairment of the good inherent properties of the corresponding polyaniline.

Another object of the present invention is to provide a process for producing a polyaniline derivative which permits a predetermined amount of hydrocarbon groups.

The present inventors have carried out an extensive investigation with a view toward overcoming the problems described above. As a result, it has been found that these problems can be overcome by introducing a hydrocarbon group to nitrogen atoms of the polyaniline, leading to the completion of the present invention.

This invention is therefore directed to a process for the production of a polyaniline derivative. The principal feature of the process resides in that a halogenated hydrocarbon is reacted to a reduced polyaniline to introduce a hydrocarbon group to nitrogen atoms of the reduced polyaniline.

In more detail, the production process of the present invention comprises treating a polyaniline with ammonia to convert the polyaniline to a soluble polyaniline; treating the soluble polyaniline with excess hydrazine to convert the soluble polyaniline to a reduced polyaniline; dissolving the reduced polyaniline in an amide solvent selected from the group consisting of N-methyl-2-pyrrolidone or N,N-dimethylacetamide; and adding a halogenated hydrocarbon to the resulting solution, thereby introducing a hydrocarbon group to nitrogen atoms of the reduced polyaniline.

The present invention permits introduction of hydrocarbon groups in a desired proportion. A polyaniline derivative, which is soluble in organic solvents and has excellent processablility such as film formability or coating applicability, can therefore be produced without impairment of the inherent good properties of the corresponding polyaniline.

DETAILED DESCRIPTION OF PREFERRED EMBODIMENTS

The present invention will hereinafter be described in detail.

Usable in the practice of this invention is a polyaniline which has been obtained by oxidative polymerization of aniline using ammonium persulfate or the like as oxidizing agents, for example, at a temperature in the range of from $-20°$ C. to $50°$ C. and which has a number average molecular weight of 2,000–500,000 (as measured by GPC in N-methyl-2-pyrrolidone as a solvent and converted relative to polystyrene). First of all, the polyaniline is treated with ammonia to convert it to a soluble polyaniline. The soluble polyaniline is then treated with excess hydrazine to prepare a reduced polyaniline. The term "reduced polyaniline" means a reduced product of the above polyaniline as obtained by the oxidative polymerizaiton, said reduced product containing a hydrogen atom bonded to each of all nitrogen atoms contained in the polyaniline. The hydrazine treatment can be effected by dispersing the soluble polyaniline in water, adding hydrazine in an amount at least equivalent to, preferably three times the nitrogen atoms in the polyaniline in a nitrogen atmosphere and then stirring the resultant mixture at $0°–30°$ C. for 24 hours.

The reduced polyaniline thus obtained is solublein N-methyl-2-pyrrolidone or N,N-dimethylacetamide but is practically insoluble in other general organic solvents, for example, chloroform and tetrahydrofuran.

Next, a halogenated hydrocarbon is caused to act on the reduced polyaniline to effect a replacement reaction. This replacement reaction can be conducted by dissolving the reduced polyaniline in N-methyl-2-pyrrolidone or N,N-dimethylacetamide, adding dropwise the halogenated hydrocarbon to the resultant solution in a nitrogen atmosphere and then stirring the resultant mixture in a temperature range of from $-10°$ C. to $100°$ C.

Illustrative of the halogenated hydrocarbon usable in the practice of the present invention include hydrocarbons having at least 4 carbon atoms with at least one hydrogen atom thereof having been substituted by a halogen atom (e.g., chlorine, bromine or iodine atom). These halogenated hydrocarbons may have any structure of a linear structure, a branced structure or a cyclic structure. They may contain one or more double or triple bonds. Specific examples of preferred hydrocarbons include saturated linear hydrocarbons having 4–22 carbon atoms, for example, butane, pentane, hexane, heptane, octane, nonane, decane, undecane, dodecane, hexadecane and docosane; branched saturated hydrocarbons having 4–22 carbon atoms, for example, isobutane, isopentane, neopentane and isohexane; linear hydrocarbons having 4–22 carbon atoms and containing one or more double bonds, for example, pentene, hexene and heptene; and cyclic hydrocarbons having 4–8 carbon atoms, for example, cyclohexane. These hydrocarbons may be substituted by one or more cyano, nitro and/or hydroxyl groups.

No particular limitation is imposed on the halogenated hydrocarbon to be used in the present invention as long as one or more of the hydrogen atoms of the hydrocarbon have been substituted by a corresponding number of halogen atoms respectively. More preferred halogenated compounds include 1-bromodecane, 5-bromo-1-pentene and 6-bromo-1-cyanohexane.

In the present invention, the replacement reaction by the halogenated hydrocarbon can be conduct-ed preferably in such a manner that hydrocarbongroups can be introduced to at least 5% of the nitrogen atoms of the reduced polyaniline.

It is desirable to subject the N-hydrocarbyl-substituted polyaniline, which has been obtained as described above, to undoping treatment as a post treatment with aqueous ammonia.

The N-hydrocarbyl-substituted polyaniline produced by the present invention is soluble not only in N-methyl-2-pyrrolidone and N,N-dimethylacetamide but also in halogenated hydrocarbon solvents such as chloroform, dichloroethane and dichloromethane and ether solvents such as tetrahydrofuran. Using a solution of the N-hydrocarbyl-substituted polyaniline in one of the above solvents, good self-standing films can be obtained by casting. The films so formed show conductivity as high as $10^{-3}$ — $10^1$ S/cm after they have been doped in a protonic acid such as hydrochloric acid, sulfuric acid, hydroboric acid, hydrogen borofluoride or perchloric acid.

The hue of each polyaniline derivative produced in accordance with the process of the present invention varies depending on the polarity of each solvent, thereby making it possible to use the polyaniline derivative as a polarity indicator material for solvents. The hue also varies depending on the hydrogen ion concentration, so that the polyaniline derivative can also be used as a hydrogen ion etector.

EXAMPLES

The present invention will hereinafter be described by following examples.

EXAMPLE 1

Aniline (4.1 g) and concentrated hydrochloric acid (21.9 g) were dissolved in water to give an aniline solution (100 ml). The aniline solution was chilled to $-5$ C. Concentrated hydrochloric acid (21.9 g) and ammonium persulfate (6.28 g) were also dissolved in water to give a solution (100 ml). The latter solution was also chilled to $-5$ C and was then slowly added dropwise to the aniline solution, followed by stirring at $-5$ C. for 4 hours. The thus-obtained polyaniline having a number average molecular weight of 12,000 (as measured by GPC in N-methyl-2-pyrrolidone as a solvent and converted relative to polystyrene) was washed thoroughly with water, followed by undoping treatment with aqueous ammonia.

The resulting soluble polyaniline was dispersed in water (200 ml), followed by the addition of hydrazine (50 ml) in a nitrogen atmosphere. The mixture thus obtained was continuously stirred for 24 hours at room temperature. The resultant precipitate was collected by filtration and then dried, whereby a reduced polyaniline of a grayish white color was obtained.

The reduced polyaniline (1 g) so obtained was completely dissolved in N-methyl-2-pyrrolidone (20 ml). After the reaction system having been thoroughly purged with nitrogen gas, 1-bromodecane (0.5 g) was added. The mixture was stirred for 6 hours so that they were reacted. The reaction mixture was poured into water (1 liter) while the resulting mixture was stirred. The resulting precipitate was collected by filtration, dried and then subjected to undoping treatment with aqueous ammonia, whereby a polyaniline derivative with decyl groups introduced to certain nitrogen atoms was obtained in an amount of 1.4 g. From the yield of the reaction, the degree of substitution at the nitrogen atoms was found to be 20%.

The polyaniline derivative was soluble in N-methyl-2-pyrrolidone and also showed high solubility in organic solvents such as chloroform, dichloroethane, dichloromethane and tetrahydrofuran. From solutions of the polyaniline derivatives in the solvents described above, self-standing films were satisfactorily obtained by casting. When the self-standing film obtained from the chloroform solution of the polyaniline derivative was doped with sulfuric acid by way of example, the conductivity was 2.5 S/cm. Further, the film before the doping was successfully dissolved in the above-described organic solvents, namely, N-methyl-2-pyrrolidone, N,N-dimethylacetamide, chloroform, dichloroethane, dichloromethane and tetrahydrofuran.

EXAMPLE 2

An N-substituted polyaniline derivative (1.1 g) was obtained in a similar manner to Example 1 except that 5-bromo-1-pentene (0.2 g) was used in lieu of 1-bromodecane. From the yield of the reaction, the degree of substitution at nitroten atoms was found to be 12%.

The polyaniline derivative was soluble in N-methyl-2-pyrrolidone and also showed high solubility in organic solvents such as chloroform, dichloroethane, dichloromethane and tetrahydrofuran. When a self-standing film obtained from a chloroform solution of the polyaniline derivative was doped with sulfuric acid, the conductivity was 0.5 S/cm. Further, the film before the doping was successfully dissolved in the above-described organic solvents, namely, N-methyl-2-pyrrolidone, N,N-dimethylacetamide, chloroform, dichloroethane, dichloromethane and tetrahydrofuran.

EXAMPLE 3

An N-substituted polyaniline derivative (1.1 g) was obtained in a similar manner to Example 1 except that 6-bromo-1-cyanohexane (0.2 g) was used in place of 1-bromodecane. From the yield of the reaction, the degree of substitution at the nitrogen atoms atoms was found to be 9%.

The polyaniline derivative was soluble in N-methyl-2-pyrrolidone and also showed high solubility in organic solvents such as chloroform, dichloroethane, dichloromethane and tetrahydrofuran. When a self-standing film obtained from a chloroform solution of the polyaniline derivative was doped with sulfuric acid, the conductivity was 0.05 S/cm. Further, the film before the doping was successfully dissolved in the above-described organic solvents, namely, N-methyl-2-pyrrolidone, N,N-dimethylacetamide, chloroform, dichloroethane, dichloromethane and tetrahydrofuran.

COMPARATIVE EXAMPLE

Aniline (4.1 g) and concentrated hydrochloric acid (21.9 g) were dissolved in water to give an aniline solution (100 ml). The aniline solution was chilled to $-5°$ C. Concentrated hydrochloric acid (21.9 g) and ammonium persulfate (6.28 g) were also dissolved in water to give a solution (100 ml). The latter solution was also chilled to $-5°$ C. and was then slowly added dropwise to the aniline solution, followed by stirring at $-5°$ C. for 4 hours. The thus-obtained polyaniline was washed thoroughly with water, followed by undoping treatment with aqueous ammonia.

The polyaniline thus obtained was soluble in N-methyl-2-pyrrolidone, and a self-standing film was successfully obtained from a solution of polyaniline in N-methyl-2-pyrrolidone. However, the polyaniline was insoluble in chloroform or tetrahydrofuran. Moreover, the self-standing film thus obtained was not soluble in any organic solvents.

I claim:

1. A process for the production of a polyaniline derivative, which comprises:
   treating a polyaniline with ammonia to convert the polyaniline to a soluble polyaniline;
   treating the soluble polyaniline with excess hydrazine to convert the soluble polyaniline to a reduced polyaniline;
   dissolving the reduced polyaniline in an amide solvent selected from the group consisting of N-methyl-2-pyrrolidone and N,N-dimethylacetamide; and
   adding a halogenated hydrocarbon to the resulting solution, thereby introducing a hydrocarbon group to nitrogen atoms of the reduced polyaniline.

2. The process of claim 1, wherein the halogenated hydrocarbon is a hydrocarbon having at least 4 carbon atoms, with at least one hydrogen atom thereof having been substituted by a halogen atom.

3. The process of claim 2, wherein the halogenated hydrocarbon is selected from the group consisting of monohalides of saturated linear hydrocarbons having 4–22 carbon atoms, monohalides of saturated branched hydrocarbons having 4–22 carbon atoms, monohalides of linear hydrocarbons having 4–22 carbon atoms and containing at least one double bond, and monohalides of saturated cyclic hydrocarbons having 4–8 carbon atoms.

4. The process of claim 2, wherein the halogenated hydrocarbon is 1-bromodecane.

5. The process of claim 2, wherein the halogenated hydrocarbon is 5-bromo-1-pentene.

6. The process of claim 2, wherein the halogenated hydrocarbon is 6-bromo-1-cyanohexane.

* * * * *